2642X
E. L'Hommedieu,
Wood Auger.
Patented July 17, 1816.
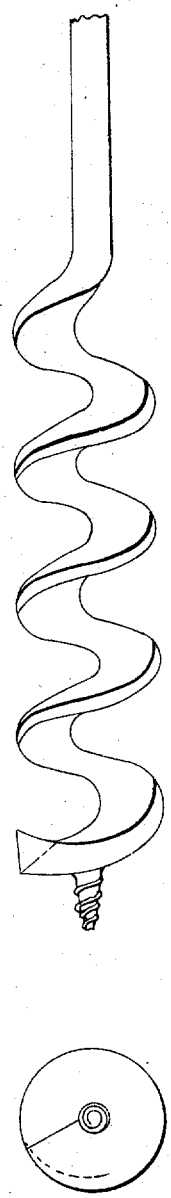
AM. PHOTO-LITHO. CO. N.Y. (OSBORNE'S PROCESS.)

July 17, 1816 2642X 52

Ezra L. Hommedieu a Citizen of

Letters Patent.

The Schedule referred to in these Letters Patent and making part of the same, containing a description in the words of the said Ezra L'Hommedieu himself of his improvement in the Screw Auger called the single twist Auger.

This auger has but one lip that cuts the timber plank &c. & but one twist or spiral thread & but one spiral cavity & may be used with or without a screw or worm at the cutting end. The common twist auger has two lips two spiral threads & cavities & a screw at the cutting end. The advantages of the (single twist Auger) are that the cavity for the chips is larger than in the common twist auger & the form of it is such that the chips pass up more freely & are not crowded together as in the common twist and pod augers. As soon as the chip is cut it runs up through the spiral cavity of the twist with the natural turns of the auger of the auger. And the auger never needs taking out to clear out the chips until after the whole spiral cavity is below the surface of the timber, & the longer the twist of the auger or spiral cavity the deeper may it be bored without clearing. This auger will turns as easy at the depth of two feet (if the twist be so long) as when first entering the surface of the wood. The chips pass up single and freely without crowding or wedging one another as in the common twist or pod auger. In the common twist auger the chips crowd one against another & rise up with difficulty and therefore the auger needs taking out to clear often and turns hard when partly filled with chips. This auger may be used after the screw or worm is worn out or broke off; The twist may be made of any indefinite length & the shaft & handle may be made like common Augers. Ez Witnesses, Eli Warner. Ezra L'Hommedieu My (261 words) Robert C. Foley